United States Patent
Speidel et al.

[11] Patent Number: 5,845,557
[45] Date of Patent: Dec. 8, 1998

[54] SERVO VALVE

[75] Inventors: Gerd Speidel, Winterbach; Ernst-Heinrich Fasse, Schorndorf, both of Germany

[73] Assignee: Mercedes-Benz AG, Stuttgart, Germany

[21] Appl. No.: 824,089

[22] Filed: Mar. 24, 1997

[30] Foreign Application Priority Data

Apr. 19, 1996 [DE] Germany ............... 196 15 543.6

[51] Int. Cl.⁶ ..................... F15B 13/01; B62D 5/083
[52] U.S. Cl. ........................................... 91/375 A
[58] Field of Search ....................... 91/375 R, 375 A

[56] References Cited

U.S. PATENT DOCUMENTS

| | | | |
|---|---|---|---|
| 2,983,283 | 5/1961 | Sattavara | 137/625.25 |
| 4,458,580 | 7/1984 | Masuda et al. | 91/375 R |
| 4,488,475 | 12/1984 | Masuda et al. | 91/375 R |
| 5,311,906 | 5/1994 | Phillips | 91/375 A |
| 5,478,059 | 12/1995 | Toyoshi et al. | 91/375 A |

FOREIGN PATENT DOCUMENTS

| | | |
|---|---|---|
| 2 496 583 | 6/1982 | France . |
| 2 256 073 | 5/1974 | Germany . |
| 42 20 070 | 12/1993 | Germany . |
| 57-104463 | 6/1982 | Japan . |
| 63-501209 | 5/1988 | Japan . |
| 2-133283 | 5/1990 | Japan . |
| WO 94/00329 | 1/1994 | WIPO . |

*Primary Examiner*—Sheldon J. Richter
*Attorney, Agent, or Firm*—Klaus J. Bach

[57] ABSTRACT

In a servo valve for hydraulic power steerings of motor vehicles which consists of a rotary spool valve having a rotary spool rotatably disposed in a control sleeve, a front end of the control sleeve and a flange structure on the rotary spool have spaced oppositely arranged faces forming a gap therebetween in which a C-shaped spring is disposed which extends around the rotary spool and has free opposite ends in engagement with pins projecting axially toward one another from the opposite faces of the control sleeve and the flange structure when both are in a center position relative to one another so as to bias the control sleeve and the flange structure into such center position with a predetermined spring force.

8 Claims, 5 Drawing Sheets

SERVO VALVE

BACKGROUND OF THE INVENTION

The invention resides in a servo valve, especially for hydraulic power steerings of motor vehicles, in the form of a rotary spool valve with a rotary spool and a control sleeve disposed co-axially around the spool so as to be rotatable relative to the spool against the force of a spring.

Such servo valves are generally known and are utilized in large numbers. With a power steering of a motor vehicle having the usual steering means including a steering wheel, the rotary spool and the control sleeve are part of a shaft structure which couples the steering wheel mechanically with the steered vehicle wheels. Depending on the forces and torques effective between the steering wheel and the steered vehicle wheels, the control sleeve and the rotary spool are moved relative to each other out of a center position against the force of a spring biasing the control sleeve and the rotary spool into the center position. The rotary displacement between the control sleeve and the rotary spool actuates the servo valve which controls the admission of hydraulic fluid under pressure, or the application of a hydraulic pressure difference, to a hydraulic servo motor depending on the direction of the relative rotation between the control sleeve and the rotary spool. In this way, the steering movement is enhanced that is the manual force required for operating the steering wheel is correspondingly reduced.

The spring force is generally provided by a torsion rod by which the rotary spool and the control sleeve are mechanically coupled. The rotary spool and the axially adjacent components of the control sleeve, that is the elements which are connected to the control sleeve for rotation therewith, are tubular and the torsion rod extends through those components.

It is the object of the present invention to provide a servo valve of the type described above which is of a particularly advantageous design.

SUMMARY OF THE INVENTION

In a servo valve for hydraulic power steerings of motor vehicles which consists of a rotary spool valve having a rotary spool rotatably disposed in a control sleeve, a front end of the control sleeve and a flange structure on the rotary spool have spaced opposite end faces forming a gap therebetween in which a C-shaped spring is disposed. The C shaped spring extends around the rotary spool and has free opposite ends in engagement with pins projecting axially toward one another from the end faces of the control sleeve and the flange structure when both are in a center position relative to one another so as to bias the control sleeve and the flange structure into the center position with a predetermined spring force.

In the arrangement according to the invention, the C-shaped spring, which is disposed axially between a front end of the control sleeve and the flange structure of the rotary spool and extends around a portion of the rotary spool, is opened during relative movement between the control sleeve and the rotary spool since, during such relative movement, the pins move away from one another so that the C-spring is more or less bent open.

In such an arrangement, the C-shaped spring is easy to assemble. The spring furthermore can be pretensioned to a predetermined degree so that oppositely directed forces are applied to the pins already when the pins are in alignment that is, even when no torque is applied to the steering wheel. Then a hydraulic control valve operated by the relative movement between the rotary spool and the sleeve is actuated only after the spring pretension forces are exceeded, that is hydraulic steering assistance is provided only when a certain steering forceis exceeded.

Below a preferred embodiment of the invention will be described on the basis of the accompanying drawings.

DESCRIPTION OF PREFERRED EMBODIMENTS

Figure 1:
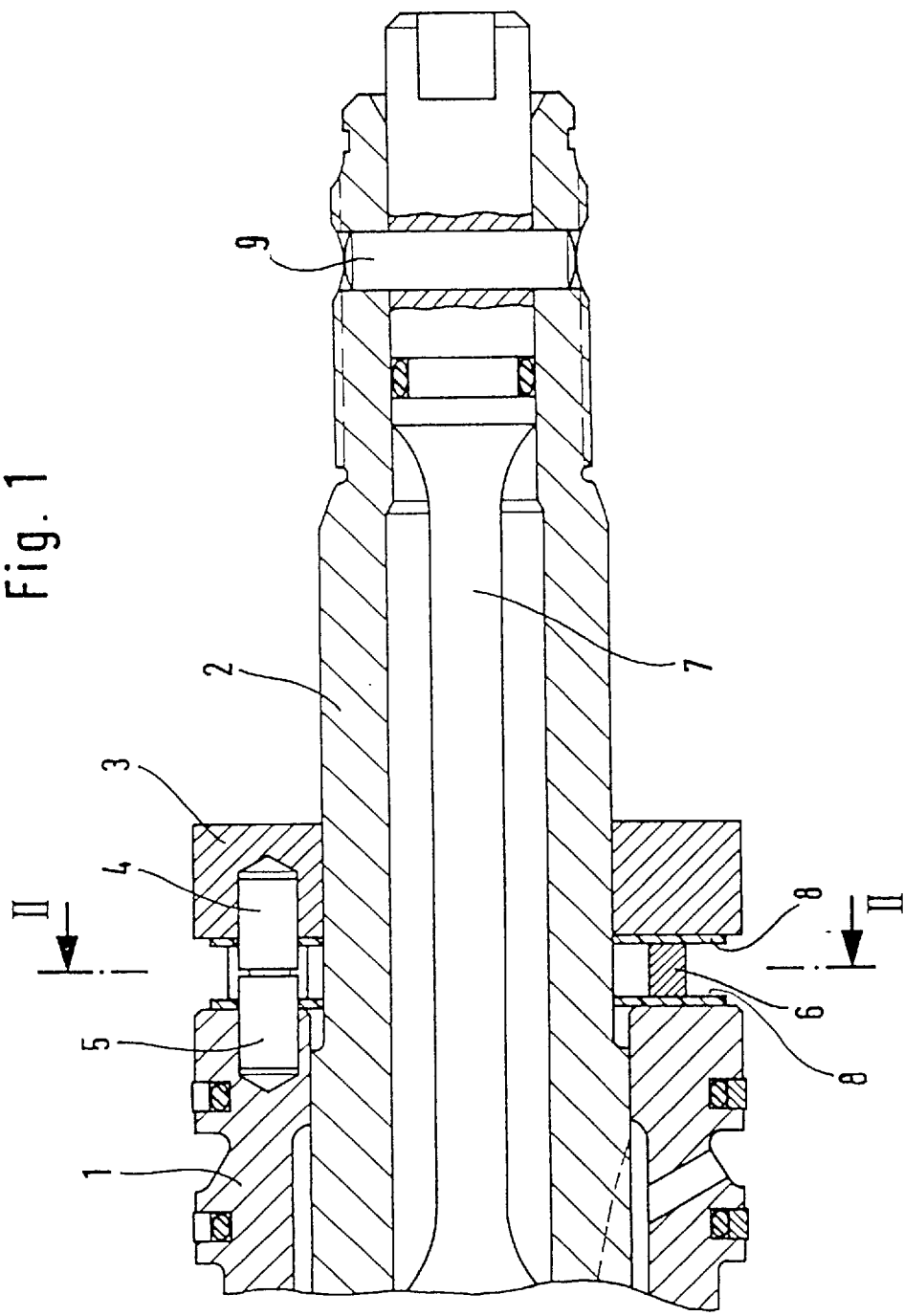
FIG. 1 is a partial cross-sectional view of a rotary spool-type servo valve according to the invention.

The servo valve as shown in FIG. 1 includes—as is generally known—a control sleeve 1 which receives co-axially therein a rotary spool 2 which is rotatably disposed within the control sleeve 1. The rotary spool 2 has a flange 3 mounted thereon at a distance from the front end of the control sleeve 1 so as to form a gap therebetween. Pins 4 and 5 extend from the opposite faces of the control sleeve 1 and the flange 3 so as to be parallel to the axis of the control sleeve 1 and the rotary spool and at the same distance therefrom such that they can be normally in axial alignment with one another. The combined length of the axially projecting ends of the pins 4 and 5 is slightly less than the gap width between the end face of the control sleeve 1 and the flange 3 so that the pins 4 and 5 do not impede relative rotation between the control sleeve 1 and the flange 3, or, respectively, the rotary spool 2 connected thereto.

In the gap between the control sleeve 1 and the flange 3 a C-shaped spring is arranged which extends around the rotary spool 2 with a radial distance therefrom and which has an axial width (in the direction of the axis of the control sleeve 2 and the rotary spool 2) corresponding essentially to the axial width of the gap between the end face of the control sleeve 1 and the flange 3.

The free ends of the C-shaped spring 6 have semicircularly curved end faces which abut the pins 4 and 5 in a form-locking fashion with a predetermined spring force.

By relative rotation of the control sleeve 1 and the flange 3 or the rotary spool 2, the pins 4 and 5 move apart from one another in circumferential direction of the rotary spool 2 whereby the C-spring 6 is bent open as its opposite ends are engaged and carried along by the opposite pins 4 and 5. In this way, the C-spring 6 generates a return force which increases with increasing displacement of the pins 4 and 5 from one another and which biases the pins into a position in which they are in alignment with each other and in which the control sleeve 1 and the rotary spool 2 are in their relative center positions.

Even when the pins 4 and 5 are in alignment, a predetermined engagement force may be applied by the C-spring 6 so that relative movement between the control sleeve 1 and the rotary spool 2 occurs only when a torque is applied which is large enough to overcome the predetermined engagement force.

In order to reduce any friction plastic washers 8, particularly of teflon, may be disposed between the spring 6 and the adjacent faces of the control sleeve 1 and the flange 3. Alternatively, the end faces of the control sleeve 1 and of the flange 2 or, even better, of the C-spring 6 may be coated with a friction reducing material.

The control sleeve 1 and the rotary spool 2 may further be interconnected by a torsion rod 7 which extends in a well known manner through the tubular rotary spool 2 and which is, at its one end, firmly interconnected with the rotary spool 2 for example by a locking pin 9 and, at its other end, with the control sleeve 1 or another component connected thereto for rotation therewith.

Figure 2:
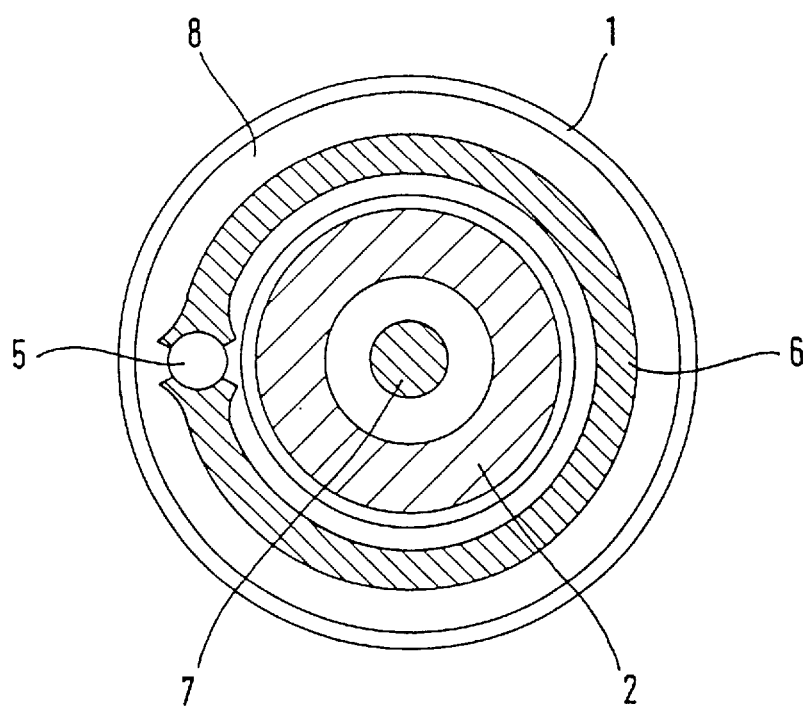
FIG. 2 is a cross-sectional view taken along line II—II of FIG. 1.
Figure 3:
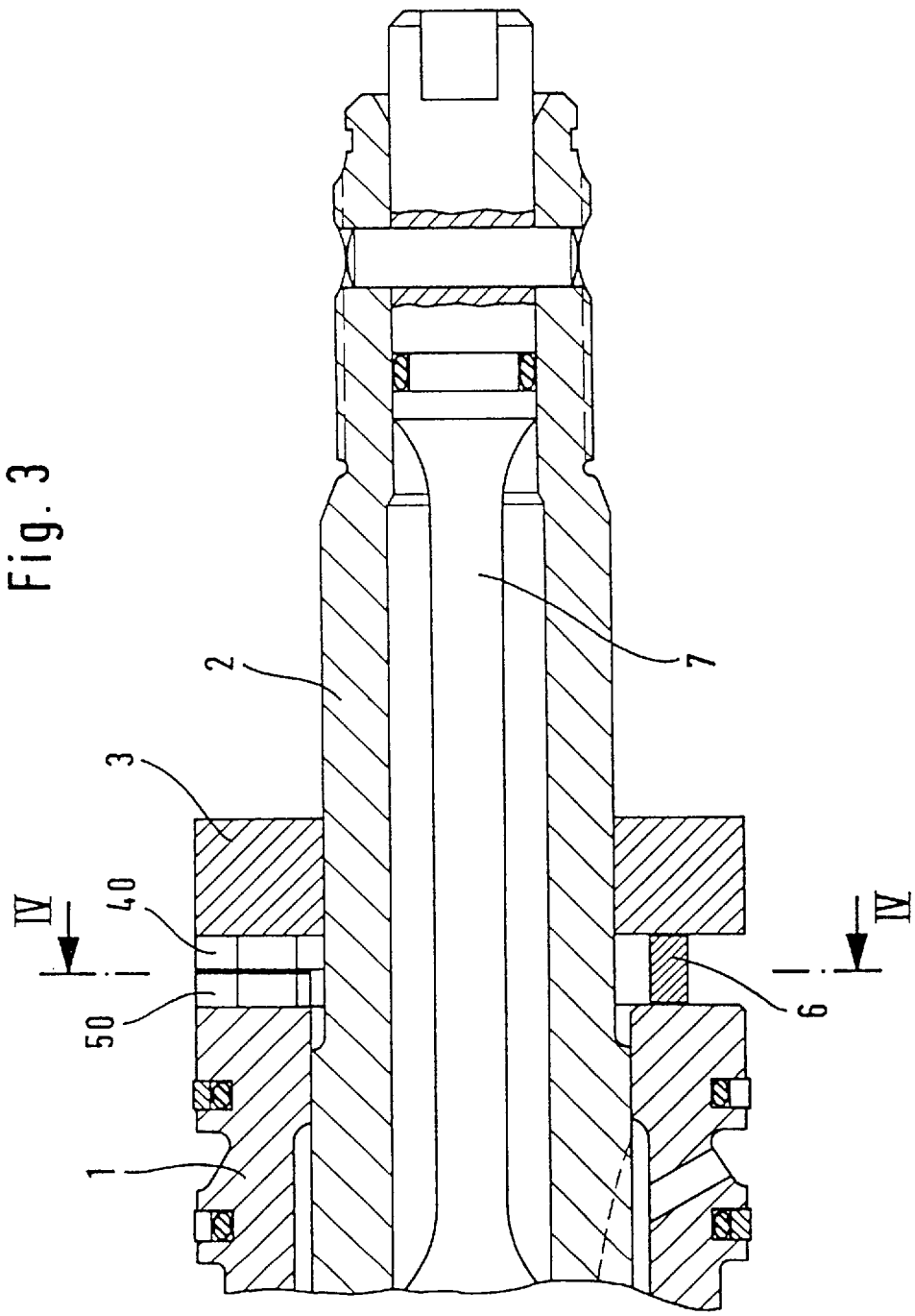
FIG. 3 shows in a view, corresponding to that of FIG. 1, a modified embodiment of the invention.
Figure 4:
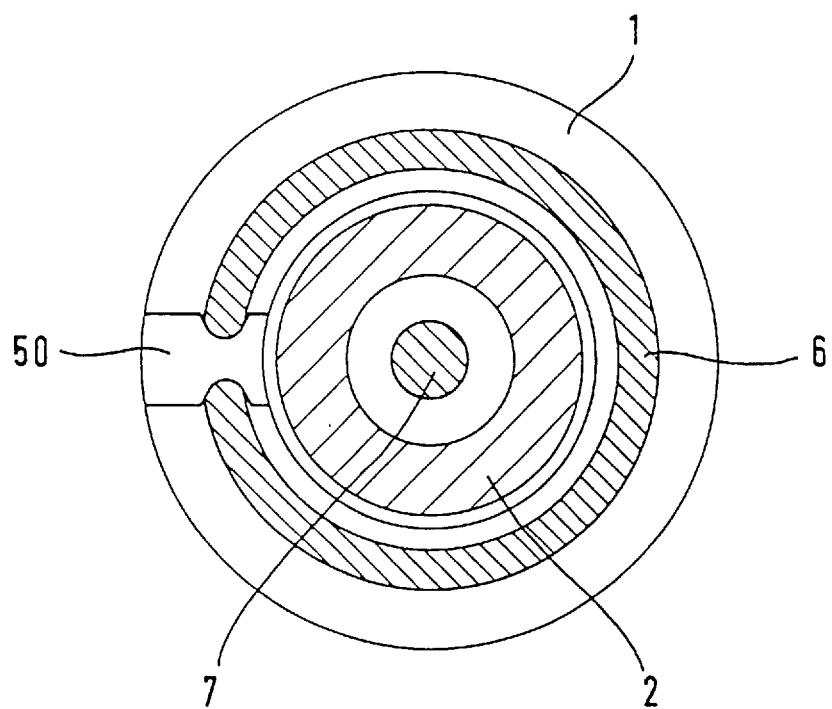
FIG. 4 is a cross-sectional view taken along line IV—IV of FIG. 3.

The embodiment of the invention as shown in FIGS. 3 and 4 is different from the embodiment of FIGS. 1 and 2 essentially in that, in place of the pins 4 and 5, the control sleeve 1 and the flange 3 have each axial extensions 50 and, respectively, 40. The extensions 50 and 40 are at their, with respect to the axis of the control sleeve 1, radially and axially extending sides, provided with recesses of semicircular shape formed at opposite sides at equal distances from the axis of the control sleeve 1. The C-shaped spring 6 has corresponding semicircularly shaped end faces which are received in the recesses whereby the arrangement provides for the same effects as the arrangement according to FIGS. 1 and 2.

Figure 5:
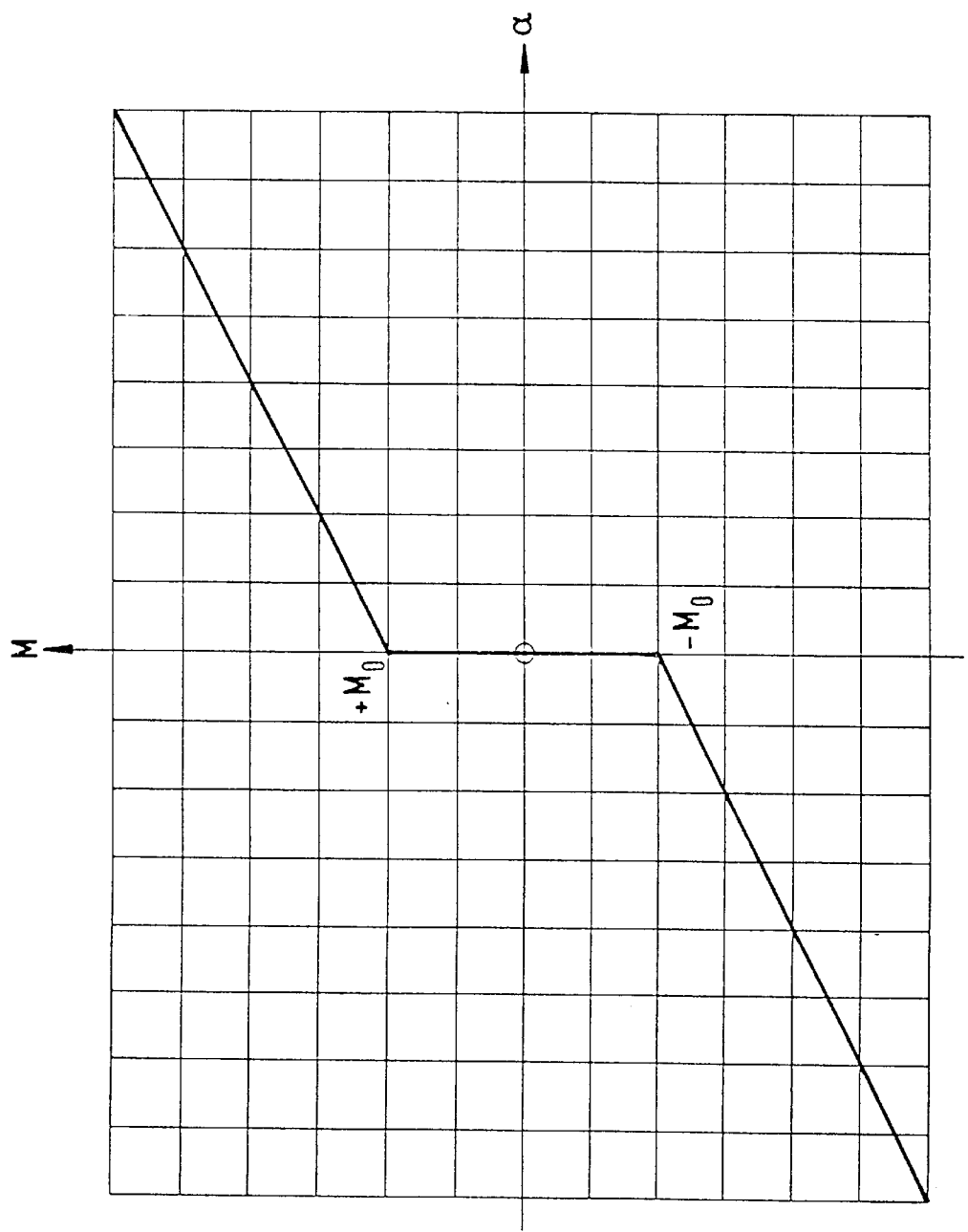
FIG. 5 is a diagram showing the spring characteristic of the C-spring engaging the pins with a certain pretension.

The diagram of FIG. 5 shows the spring characteristics of the C-shaped spring 6 giving the spring return torque M generated upon relative rotary displacement of the control sleeve 1 and the rotary spool 2 (or the flange 3) by an angle α. For leaving the center position in which the C-shape spring 6 forces the sleeve 1 and the rotary spool 2, the pretension force of the C-shaped spring 6 must first be overcome, that is, an initial torque +Mo or −Mo must first be provided (the + or − signs indicate the direction of rotation). With increasing twist-angle α, the return torque provided by the C-shaped spring 6 increases continuously.

The valve structure which controls the admission of hydraulic fluid under pressure to the power steering operating cylinder for assisting the steering of the steered vehicle wheels is not shown in the drawings as this structure is well known in the art and shown, for example, in detail in patent publication PCT/EP93/01570 with which the arrangement according to the present invention could be easily utilized.

What is claimed is:

1. A servo valve especially for hydraulic power steerings of motor vehicles, consisting of a rotary spool valve having a rotary spool received in a control sleeve so as to be rotatable relative to the control sleeve and spring means biasing said rotary spool and said control sleeve into a center position relative to one another, said control sleeve having a front end and said rotary spool having a face structure disposed opposite the front end of said control sleeve and in spaced relationship therefrom so as to form a gap therebetween, said control sleeve front end and said face structure having means axially projecting therefrom toward one another at a predetermined distance from the axis of said control sleeve and said rotary spool and having a combined length somewhat less than the width of said gap, and a C-shaped spring disposed in said gap around said rotary spool and having opposite free ends engaging said axially projecting means for biasing said rotary spool and said control sleeve into a center position in which said axially projecting means are in axial alignment with each other.

2. A servo valve according to claim 1, wherein said rotary spool is provided with a flange and said face structure is formed on said flange.

3. A servo valve according to claim 2, wherein said flange is firmly mounted on said rotary spool by form-locking engagement therewith, or by welding, for rotation with said rotary spool.

4. A servo valve according to claim 1, wherein said C-shaped spring has a width in axial direction of said rotary spool valve which corresponds to the axial width of said gap.

5. A servo valve according to claim 1, wherein said axially projecting means are pins of circular cross-section and the free ends of said C-shaped spring have circularly curved recesses adapted to receive said pins.

6. A servo valve according to claim 1, wherein said axially projecting means are wall portions with radially and axially extending side walls which have opposite recesses arranged at the same distance from the axis of said control sleeve and said C-shaped spring has free ends with profiles opposite to those of said recesses and being received in said recesses.

7. A servo valve according to claim 1, wherein said C-shaped spring engages said axially projecting means with a predetermined spring engagement force even when said axially projecting means are in axial alignment.

8. A servo valve according to claim 1, wherein said control sleeve and said rotary spool are interconnected by a torsion rod.

\* \* \* \* \*